Feb. 28, 1956 E. C. ELSNER 2,736,272
QUICK ATTACHMENT FITTING
Filed May 15, 1952 2 Sheets-Sheet 1
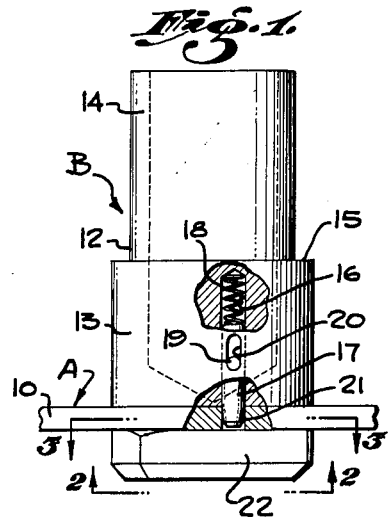
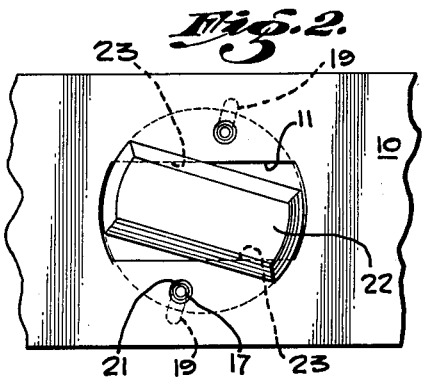
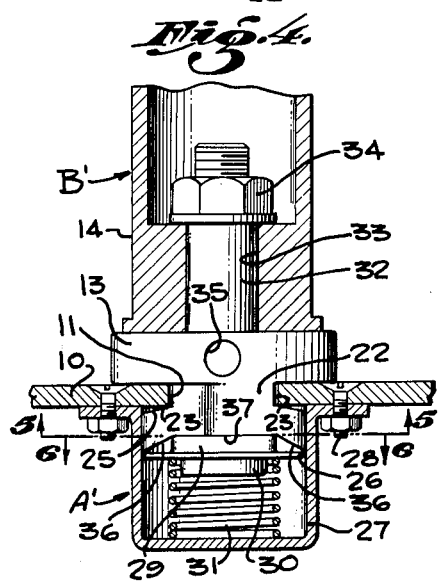
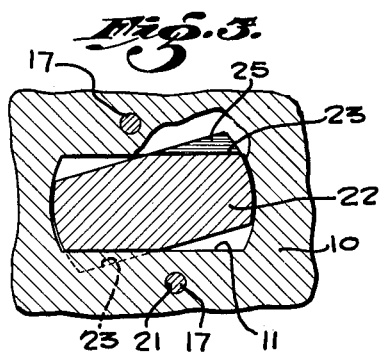
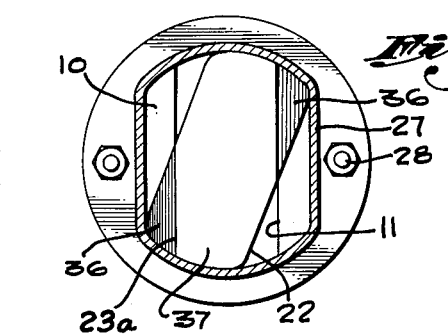
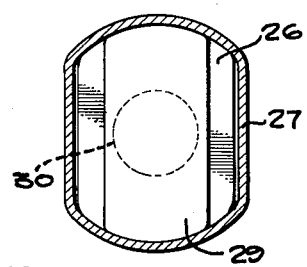
EDWIN C. ELSNER,
INVENTOR.
BY
ATTORNEY

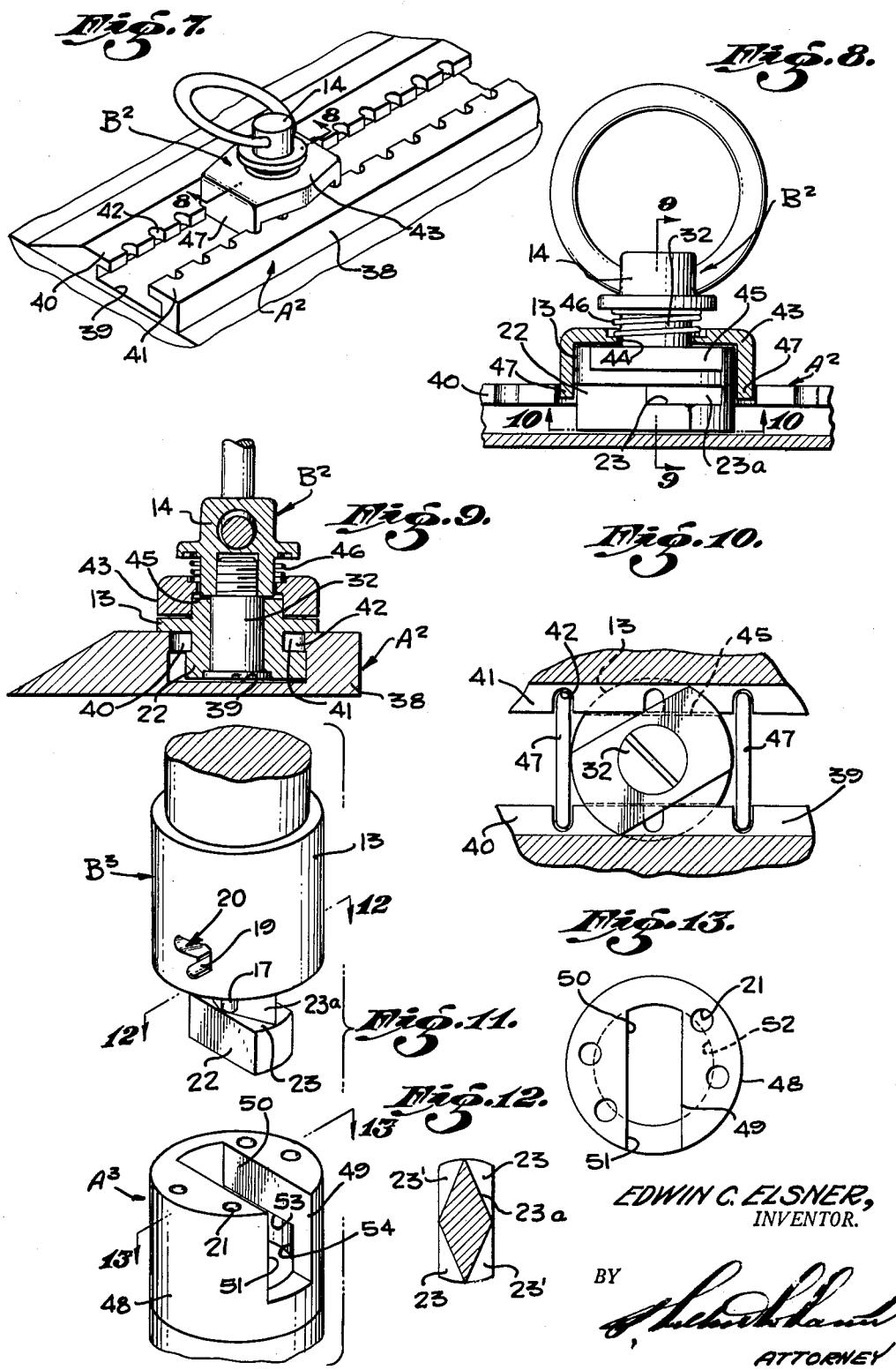

United States Patent Office 2,736,272
Patented Feb. 28, 1956

2,736,272
QUICK ATTACHMENT FITTING
Edwin C. Elsner, Glendale, Calif.
Application May 15, 1952, Serial No. 287,880
16 Claims. (Cl. 105—369)

The present invention relates generally to connecting and fastening devices, and is more particularly concerned with an attachment fitting of the type which may be quickly connected and disconnected by simple manipulation, and is susceptible of wide application.

Quickly attachable and detachable fittings of the herein described type are adapted for general application for the securing of parts together in such a manner that they may be readily and quickly detached, when desired. Such fittings are of special advantage and usefulness for the securing of chairs, tables, etc., to floors and decks, for use in connection with cargo tie-down systems, and for retaining stanchions, partitions and wall members generally in a position of use.

With the foregoing in mind, it is within the general concepts of the present invention to provide a releasable connecting and fastening means of simple, compact and rigorous construction having a small number of parts, which are so arranged and associated that they will permit quick attachment and detachment, and which basically embody an arrangement which is susceptible of incorporation into a variety of devices adapted for particular uses.

A further object is to provide in connection with devices of this character, novel latching means for releasably retaining the parts of the fitting in connected position.

Another object is to provide in one embodiment of the invention, utilizing a deck plate having a slot opening therein latch means which will also function to close the opening when the complementary part of the attachment fitting is not being utilized.

Still another object is to provide a quick attachment fitting embodying the novel features of the invention, which may be utilized in connection with a rail member.

It is also an object to provide a quick attachment fitting of the herein described type which may be utilized to interconnect elongate members in end to end relationship, the fittings being so arranged that the elongate members may be interconnected by endwise or lateral movement to interconnected position, and wherein consideration does not have to be given to the matter of "right" or "left" connecting parts. The arrangement for lateral movement of the members to connecting position is of particular advantage where a member is to be inserted between two other members, and there is only sufficient space to laterally receive the inserted member and there is no room to permit endwise assembly of the members.

Further objects of the invention will be brought out in the following part of the specification, wherein detailed description is for the purpose of fully disclosing several embodiments of the invention without placing limitations thereon.

Referring to the accompanying drawings, which are for illustrative purposes only:

Fig. 1 is an elevational view of a quick attachment fitting embodying the basic features of the invention;

Fig. 2 is a bottom plan view as it appears when viewed from line 2—2 of Fig. 1.

Fig. 3 is a transverse sectional view having a cutaway portion to indicate certain features, taken substantially on line 3—3 of Fig. 1.

Fig. 4 is a longitudinal sectional view of a modified form of the invention;

Fig. 5 is a transverse sectional view, showing details of the latching and interlocking mechanism, taken substantially on line 5—5 of Fig. 4;

Fig. 6 is a transverse sectional view, showing details of the locking member, taken substantially on line 6—6 of Fig. 4;

Fig. 7 is a modified form of the invention, wherein one of the complementary parts comprises an elongate rail structure;

Fig. 8 is a longitudinal transverse section, taken substantially on line 8—8 of Fig. 7;

Fig. 9 is a transverse sectional view, taken substantially on line 9—9 of Fig. 8;

Fig. 10 is a fragmentary view of the cooperatively associated parts as they appear when viewed from the direction indicated by line 10—10 of Fig. 8;

Fig. 11 is an expanded view showing the component parts of still another modified form of the invention;

Fig. 12 is a transverse sectional view through one part of the fitting, taken substantially on line 12—12 of Fig. 11; and Fig. 13 is an end plan view of a complementary part of the fitting as viewed in the direction indicated by line 13—13 of Fig. 11.

Referring now to the drawings generally, for illustrative purposes the invention is shown in Fig. 1 as comprising complementary structures A and B which are according to the broad concepts of the invention arranged to be connected and disconnected for the securing of parts together, and for general application for such purpose.

In this particular embodiment, the structure A may comprise a floor or deck or a plate member, as indicated by the numeral 10, which may be affixed in conventional manner to the floor or deck. Whichever structure A is utilized, the member 10 is provided with a slot opening 11 of generally rectangular configuration, except that the ends of the slot are arcuate.

The structure B, which forms a complementary part of the fitting, is disclosed as comprising a body 12 which may be of varied outer configuration, but in this instance is shown as being of cylindrical construction. The body 12 is shown as being composed of integrally formed sections 13 and 14, the latter of which is of smaller diameter and extends from the former in a manner to define an abutment shoulder 15 against which a pipe or cylindrical member inserted over the section 14 may abut.

The section 13 is provided with spring actuated detent means on diametrically opposite sides of its longitudinal axis. Each detent construction comprises a cylindrical bore 16 which opens into the end face of the section 13 and has reciprocably mounted therein a detent pin 17. The pin 17 is biased by an expansion coil spring 18 in an outward direction. Movement of the pin is limited by means of a laterally extending projection 19 carried by the pin and extending through an elongate slot 20 to form a digitally engageable member by means of which the detent may be moved inwardly against the force of the spring to bring the projecting end of the pin flush with the adjacent end surface of the section 13. As shown in Figs. 1 and 2, the member 10 is drilled to provide openings 21 into which the pins 17 are inserted, when the complementary parts of the fitting are in engaged interconnected position.

The end of section 13, opposite that end on which section 14 is formed, is provided with a bayonet end projection 22 having a configuration peripherally which corresponds to the configuration of the slot opening 11. That is, the end projection is in general rectangular in shape, except that the short sides are curved to correspond with the ends of the slot opening 11.

As shown most clearly in Fig. 3, diagonally opposite corners of the bayonet projection have cut therein corner grooves 23—23 having a thickness approximately equal to the thickness of the member 10, so that the projection 22 is adapted to receive portions of the associated side edges of the slot 11 in the grooves when it is rotated, the inner shoulder of each groove limting the rotation of the projection. The lower surface of each groove, as indicated by numeral 25 of Fig. 3, is bevelled at its outer corner to form in effect a camming surface which will ride against the under surface of member 10 and operate to cause a tight fitting connection between the interconnected structures A and B, when B is rotated to a position in which the detent pins 17 register with and enter the openings 21.

In order to release the structures A and B to permit their disconnection, it is only necessary to release the detents 17—17 by manually engaging the projections 19—19 and moving them in the proper direction to withdraw the detents from their associated openings 21—21. The structure B may then be rotated in a proper direction to release the bayonet projection 22 with respect to the edges of the slot 11 and permit separation of the structures.

Referring now to Fig. 4, a modified construction is illustrated which incorporates the basic principles and features of the fitting described previously. In this modification and the other modified arrangements to be subsequently discussed, like elements have been referred to by the same number as previously, where possible.

In this arrangement, the slot 11 in the member 10 is normally closed by a plate member 26 which is reciprocably supported within a cupped housing 27 dependingly suspended below the member 10 and secured thereto as by suitable bolts 28.

The plate member 26 is formed with a raised portion 29 on its upper surface, this raised portion being in the nature of a rib having the same configuration peripherally as the slot 11, and adapted to enter and close the slot when the plate member is moved to the top of its housing 27. A circular portion 30 projects from the other surface of plate member 26 to form a retainer for one end of a coil spring 31 which is positioned thereover, the other end of this spring bearing against the bottom of the housing 27.

In this arrangement, the structure B1 is changed somewhat, the sections 13 and 14 in this case being pivotally connected by a stem 32 which is integrally formed with the section 13 and projects through a bore 33 in the adjacent end of section 14. A nut 34 in threaded engagement with the free end of the stem 32 operates to retain sections 13 and 14 against separation, a washer being interposed between the nut 34 and the adjacent part of section 14.

Thus, in this arrangement the section 13 is free to be rotated independently of section 14, and as shown may be provided with openings 35 in its edge wall for receiving a tool such as a spanner wrench by which the section may be forcibly rotated.

The bayonet projection 22 in this case is likewise provided, inner shoulders 23a, and similar grooves 23 with camming surfaces 25 for engaging the edges of the slot 11. However, a different arrangement is utilized for latching the bayonet projection in interlocking engagement with member 10. For this purpose, the end surface of the bayonet projection is beveled at the corners directly below the camming surfaces 25—25, as indicated by the numeral 36, as best shown in Figs. 4 and 5. This forms in effect a groove on the end surface of the bayonet projection, this groove having sloping sides formed by the surfaces 36—36 and a bottom portion 37 which will bear against the top of projecting portion 29, and act to releasably latch and retain the bayonet projection against movement to released position, when the bayonet projection is rotated so as to interlock with the side edges of the groove 11 during the connecting operation of structures A1 and B1.

Referring now to Fig. 7, there is disclosed a modified construction of the invention, wherein the structure A2 is in the form of an elongate rail and the structure B2 is arranged for cooperative association at selected points along the rail to form a cargo tie-down ring, or for other desirable purposes.

The structure A2, more specifically, is an elongate rail member 38 having a longitudinally extending T-slot 39 traversing its length. This slot is formed by means of spaced confronting edge flanges 40 and 41, each of which is provided with spaced notches 42 therealong, the notches of the confronting flanges being transversely aligned with respect to the slot 39.

As in the arrangement described and shown in Fig. 4, the arrangement in this modification also has the sections 13 and 14 pivotally interconnected, except that in this case the stem 32 is affixed to section 14 rather than to section 13, as shown in Fig. 9.

The latching means in this modified structure is differently arranged in that in this arrangement the detent comprises a cupped member 43 which is provided in its bottom portion with an opening 44 for receiving the stem 32 therethrough to provide a guide upon which the member 43 may be raised and lowered through limited movement. The bayonet projection 22 is formed at its upper end with an elongate rib 45 which has interfitting guiding relationship with the cupped member 43, permitting the limited raising and lowering movements of member 43, but opposing independent rotational movement. The rib 45 normally supports the cupped member with its longitudinal axes disposed at an angle to the longitudinal axis of the bayonet projection 22. The cupped member 43 is normally biased in a direction towards the rib 45 by means of an expansion spring 46 surrounding the stem 32.

In interconnecting structures A2 and B2 in this form of the invention, the bayonet projection 22 thereof is inserted into the opening of the T-slot between the edge flanges 40 and 41. In this position, due to the angular relationship between the bayonet projection and the rib 45, the cupped member 43 will be angularly positioned with respect to the longitudinal center line of the slot 39. Downward pressure of section 14 will therefore cause the bayonet projection to fully enter the T-slot. By imparting a rotational movement to the cupped member 43, it may now be brought into axial alignment with the slot 39 in which position projecting end edges 47—47 of the cupped member 43 will be permitted to enter associated notches 42 of the rail member, as shown in Fig. 7. Simultaneously with the alignment of the cupped member 43, the grooves 23—23 of the bayonet projection will be relatively moved by rotation to a position wherein the edge flanges 40 and 41 will be respectively disposed therein and abut inner shoulders 23a and thus interlockingly connect structures A2 and B2.

In order to release the interconnected structures it is only necessary to raise the cupped member 43 until the edges 47—47 are above the upper surfaces of the edge flanges 40 and 41, whereupon rotative movement of the cupped member 43 will operate to align the bayonet projection 22 within the slot 39 and thus release the bayonet projection with respect to the edge flanges of the rail.

This form of invention is especially advantageous in locations where the rail member is so located that there might be a possibility of dirt or other foreign matter entering the T-slot of the rail member. From the previous discussion of the operation, it will be apparent that when the bayonet projection 22 is inserted in the slot, the projecting end edges 47—47 initially ride upon the edge flanges 40 and 41, thereby permitting the fitting to be moved lengthwise of the rail in such a manner that the bayonet projection will clean out and displace any accumulated foreign matter so as to facilitate interconnection of the associated parts.

Moreover, it will be seen that the utilization of the previously described notches 42 is such that foreign matter which might accumulate in these notches will be displaced easily by the entrance of the edges 47—47 thereinto, during the final connecting operation of the parts. It will thus be apparent that the cupped member 43 may readily move to fully seated position under the action of spring 46, since the notches 42 are open at their bottom ends and do not limit in any way the entering movement of the edges 47—47 thereinto. This feature is especially advantageous in connection with aircraft, where the rails are secured to the floor or deck structure, and when located in cargo spaces and the like, where there may be a possibility of foreign matter entering the rail slot.

Referring to Fig. 11, a modification is shown which is particularly advantageous for the interconnection of elongate members, and especially where it is desired, for example, to insert a member between two other members where the space between their ends is substantially equal to the length of the member to be inserted.

In this modification, the complementary parts of the fitting are generally indicated as A3 and B3, and are affixed to the ends of cylindrical booms, pipes or other elongate members which it is desired to be able to connect and disconnect quickly. In this arrangement, the structure B3 has a bayonet projection 22 which is provided with an additional set of diagonally opposed grooves, indicated at 23'. Again, each of the grooves has an inner shoulder 23a. Thus, the projection has a groove at each corner so that it may be rotated in either direction in order to cause an interconnection with structure A3, with the inner shoulders limiting the rotation, as will hereinafter be explained.

Instead of providing a plurality of detent pins 17, as shown in Fig. 1, there is only one detent pin provided in this arrangement. Also, instead of arranging the projection 19 so as to be reciprocably movable in an elongate slot, in this instance and as shown in Fig. 11, the slot 20 is made L-shaped so that by movement of the projection 19 laterally into the upper leg of the slot, the detent pin may be latched in retracted or released position.

Structure A3, is provided with a tubular body 48 which is also fabricated with an L-shaped slot 49, as shown in Fig. 12, a leg 50 of this slot opening into the end surface of the body 48 and a leg 51 opening into the side surface of the body 48. An internal counterbore 52 results in the formation of edge shoulder 53 along each side of the slot leg 50, and an edge 54 at the inside of leg 51 of the slot 49.

With this arrangement, the bayonet projection 22 may be inserted endwise through the leg 50 of the slot 49, or may be inserted by lateral movement through the leg 51 of the slot 49. After insertion, the projection may be rotated in either direction to a locked position wherein either the grooves 23—23 or grooves 23'—23', depending upon the direction of rotation, will be moved into interlocking relationship with the shoulder edges 53—53, and the ends of the bayonet projection will be moved back of one of the edges 54 so that the projection will be retained against either lateral or endwise removal and thus prevent separation of structures A3 and B3.

Upon rotation of the structures A3 and B3 with respect to each other, the detent pin 17, upon the parts reaching interlocked position, will enter one of the openings 21 in the end face of the body 48. In this instance, four openings 21 are provided to interlock the parts in locking position irrespective of the direction of rotation, or whether the structures are utilized for "right" or "left" assembly.

Various modifications may suggest themselves to those skilled in the art without departing from the spirit of my invention, and hence, I do not wish to be restricted to the specific form or forms shown or uses mentioned, except to the extent indicated in the appended claims.

I claim:

1. An attachment fitting, comprising: a body structure; a bayonet projection carried by said body adapted for insertion into an opening of a complementary member; side shoulders carried by said projection having cam surfaces interlockingly engageable with a part of said complementary member, upon relative rotation of said projection and said complementary member, for rigidly interconnecting and securing said body structure and said complementary member against separation.

2. An attachment fitting, comprising: a body structure; a bayonet projection pivoted on said body for rotative movement, said projection being adapted for insertion into an opening of a complementary member; means operative upon relative rotation of said projection and said complementary member for interlocking said projection and complementary member against separation; and a rotatable part for effecting said relative rotation, said part being arranged to receive an actuating tool.

3. An attachment fitting, comprising: a body structure; means including a bayonet projection pivoted on said body for rotative movement, said projection being adapted for insertion into an opening of a complementary member, and said means being adapted to receive an actuating tool; and means operative upon relative rotation of said projection and said complementary member for interlocking said projection and complementary member against separation.

4. An attachment fitting, comprising: a body structure; a bayonet projection carried by said body adapted for insertion into an opening of a complementary member; means operative upon relative rotation of said projection and said complementary member for interlockingly interconnecting said body structure and said complementary member; and a spring biased member normally closing said opening of the complementary member, but adapted to be pushed back by insertion of said projection, said projection and spring biased member having latching engagement when said body structure and said complementary member are interlockingly interconnected.

5. An attachment fitting, comprising: a body structure; a bayonet projection carried by said body adapted for insertion into an opening of a complementary member; a spring biased member normally closing said opening of the complementary member, but adapted to be pushed back by insertion of said projection; and means operative upon relative rotation in one direction of said projection and said complementary member for interlockingly interconnecting said projection and said complementary member, and releasably latching them against relative rotation in an opposite direction.

6. A two-part attachment fitting, comprising: a first part having a bayonet projection; a second part having an end opening slot adapted to receive said bayonet projection; and shoulders formed on said projection for engaging under side edges of the slot upon relative rotation of said bayonet projection in either direction from its slot entering position.

7. A two-part attachment fitting, comprising: a first part having a bayonet projection; a second part having a bayonet projection; a second part having an L-shaped slot defining an end and side opening adapted to receive said bayonet projection endwise and laterally, respectively; and means responsive to relative rotation of said parts for opposing withdrawal of said bayonet projection from said slot.

8. A two-part attachment fitting, comprising: a first part having a bayonet projection; a second part having an L-shaped slot defining end and side openings adapted to respectively receive said bayonet projection endwise and laterally; and means responsive to rotation of one of said parts in either direction with respect to the other part for opposing withdrawal of said bayonet projection from said slot.

9. A two-part attachment fitting, comprising: a first part having a bayonet projection; a second part having an end opening slot adapted to receive said bayonet projection; shoulders formed on said projection for engaging under side edges of the slot upon relative rotation of said bayonet projection in either direction from its slot entering position; and a releasable detent for latching said parts in response to said relative rotation.

10. A fastening device, comprising: an elongate rail having a longitudinally extending T-slot defined by spaced flanges; edge opening notches spaced along said flanges, with the notches on one flange being directly opposite the notches of the other flange; a body structure; a member carried by said body structufire having a projecting portion adapted in a first position of the member to be inserted into said slot between said flanges for guiding movement of said body along said rail; parts carried by said projecting portion adapted upon rotation of said member to a second position, to engage said flanges; a latch mounted on said member for unitary rotation therewith, but being independently movable towards and away from said projecting portion; a spring normally biasing said latch in a direction towards said projection; and a projection carried by said latch, this projection in said first position of said member being out of alignment with said notches, but upon movement of the member to said second position being aligned for movement into one of said notches by said spring, whereby said body is retained against said movement along said rail.

11. A fastening device comprising: a body having integral upper and lower sections; a projection carried by one of said sections, said projection being provided at diagonally opposite corners with corner grooves, said grooves being defined by a lower surface portion and an inner shoulder, and located adjacent said lower section; and means having a slot adapted to receive said projection and effect a locking connection upon relative rotation between said body and said means, said shoulders limiting said relative rotation.

12. A fastening device comprising: a body having integral upper and lower sections; a projection carried by one of said sections, said projection being provided at diagonally opposite corners with corner grooves, said grooves being defined by a lower surface portion and an inner shoulder, and located adjacent said lower section; means having a slot adapted to receive said projection and effect a locking connection upon relative rotation between said body and said means, said shoulders limiting said relative rotation; and detent means carried by said body to maintain said locking connection.

13. A fastening device comprising: a body having integral upper and lower sections; a projection carried by one of said sections and being rotationally mounted thereon, said projection being provided at diagonally opposite corners with corner grooves, said grooves being defined by a lower surface portion and an inner shoulder, and located adjacent said lower section; means having a slot adapted to receive said projection and effect a locking connection with said body; and detent means carried by said body and adapted to engage with said projection receiving means to maintain said locking connection.

14. A fastening device comprising: a body having upper and lower sections rotationally interconnected; an elongate rib on said lower section contiguous with said upper section; a projection carried by said lower section and disposed at an angle relative to said rib, said projection being provided at diagonally opposite corners with corner grooves, said grooves being defined by a lower surface portion and an inner shoulder, and located adjacent said lower section; detent means engageable with said rib and having projecting edges; and means having a slot adapted to receive said projection and said projecting edges to effect a locking connection with said body.

15. A fastening device comprising: a body having upper and lower sections rotationally interconnected; an elongate rib on said lower section contiguous with said upper section; a projection carried by said lower section and disposed at an angle relative to said rib, said projection being provided at diagonally opposite corners with corner grooves, said grooves being defined by a lower surface portion and an inner shoulder, and located adjacent said lower section; detent means carried by said body engageable with said rib and having projecting edges; and an elongate rail member having a notched slot adapted to receive said projection and said projecting edges, said edges engaging with said notched slot to effect a locking connection between said rail member and said body.

16. A fastening device comprising: a body having upper and lower sections rotationally interconnected; an elongate rib on said lower section contiguous with said upper section; a projection carried by said lower section and disposed at an angle relative to said rib, said projection being provided at diagonally opposite corners with corner grooves, said grooves being defined by a lower surface portion and an inner shoulder, and located adjacent said lower section; and detent means carried by said body engageable with said rib and having projecting edges.

References Cited in the file of this patent

UNITED STATES PATENTS

| | | |
|---|---|---|
| 2,052,914 | Williams | Sept. 1, 1936 |
| 2,268,394 | Hebert | Dec. 30, 1941 |
| 2,354,861 | Hermann | Aug. 1, 1944 |
| 2,429,190 | McArthur | Oct. 14, 1947 |
| 2,448,817 | McArthur | Sept. 7, 1948 |
| 2,532,743 | Storch | Dec. 5, 1950 |
| 2,565,204 | Cudini | Aug. 21, 1951 |
| 2,585,304 | Evans et al. | Feb. 12, 1952 |
| 2,614,871 | Grizzard et al. | Oct. 21, 1952 |
| 2,688,289 | Sterling | Sept. 7, 1954 |
| 2,688,504 | Parker | Sept. 7, 1954 |